(12) United States Patent
Kung et al.

(10) Patent No.: US 6,906,932 B2
(45) Date of Patent: Jun. 14, 2005

(54) POWER SUPPLY FOR OUTPUTTING A STEADY STATE VOLTAGE ACCORDING TO A LOAD REQUIREMENT

(75) Inventors: Shao-Tsu Kung, Taipei (TW); Chih-Tarng Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 52 days.

(21) Appl. No.: 10/609,534

(22) Filed: Jul. 1, 2003

(65) Prior Publication Data

US 2005/0002208 A1 Jan. 6, 2005

(51) Int. Cl.[7] ............................................. H02M 3/335
(52) U.S. Cl. .............................. 363/21.07; 363/21.15; 323/283
(58) Field of Search ................................. 323/282, 283, 323/349–351; 363/20, 21.04, 21.07, 21.09, 21.12, 21.15, 21.17, 97

(56) References Cited

U.S. PATENT DOCUMENTS 5,341,285 A * 8/1994 Wakefield et al. ............ 363/97
5,675,480 A * 10/1997 Stanford ....................... 307/58
5,943,227 A * 8/1999 Bryson et al. ................ 363/95

* cited by examiner

Primary Examiner—Gary L. Laxton
(74) Attorney, Agent, or Firm—Winston Hsu

(57) ABSTRACT

A power supply includes a power supply unit having an input end for receiving an oscillating voltage, and an output end for outputting a steady state voltage from the oscillating voltage according to a feedback signal, and a control circuit having a micro-controller having a first input port for receiving a measuring signal from a load, and decision logic for generating a control voltage according to the measuring signal, and a feedback controller having a first input end electrically connected to the output end of the power supply for receiving the steady state voltage, a second input end electrically connected to the micro-controller for receiving the control voltage from the micro-controller, and a output end for outputting the feedback signal according to the control voltage and the steady state voltage.

11 Claims, 3 Drawing Sheets

POWER SUPPLY FOR OUTPUTTING A STEADY STATE VOLTAGE ACCORDING TO A LOAD REQUIREMENT

BACKGROUND OF INVENTION

1. Field of the Invention

The present invention relates to a power supply, and more particularly, to a power supply which can output a steady state voltage or current according to an electrical requirement indicated by the load.

2. Description of the Prior Art

The development of the so-called information society has led to electronic devices becoming an essential part of the daily life of people. In various situations it is desirable to make a configurable arrangement for supplying electrical power to an electronic device. Conventionally, a power supply for an electronic device, such as a computer, is designed such that power is supplied from a commercial AC input, an AC/DC converter converts the input into DC power, and a DC/DC converter converts the DC power to a DC voltage required for a load inside the electronic device.

Please refer to FIG. 1. FIG. 1 is a circuit diagram of a power supply 10 according to the prior art. The power supply 10 is used for converting a commercial oscillating voltage 12 into a required steady state voltage or current, and for outputting the steady state voltage or current to a load 18 inside an electronic device (not shown) via an output port 15. The power supply 10 comprises a power supply unit 11 that has an input rectifier 14, a transformer 20, an output rectifier 24, a photo coupler 32, a switch 34, and a pulse width controller 40. The power supply 10 also includes a feedback controller 30 having a variable signal generator 44.

The input rectifier 14 is used to rectify the commercial oscillating voltage 12 into a first steady state voltage or current. The transformer 20 has a control end 17 electrically connected to the switch 34 at node N4 for controlling the on and off state of the transformer 20. The transformer 20 is used for transforming the first steady state voltage or current into a second oscillating voltage or current. The switch 34, which can be a MOS, is electrically connected to the pulse width controller 40 at node N1 for receiving a pulse signal, and is electrically connected to the control end 17 of the transformer 20 at node N4 for controlling the on and off state of the transformer 20 according to the duty cycle of the pulse signal. The pulse width controller 40, electrically connected to the switch 34 at node N1 and electrically connected to the photo coupler 32 at node N5, is used for generating a pulse signal at the node N1 so as to determine the on and off state of the switch 34 to control operation of the transformer 20.

The output rectifier 24 is electrically connected to the transformer 20 at node N2 for rectifying the second oscillating voltage from the transformer 20, so as to generate the steady state voltage or current at the output port 15 of the power supply 10.

The feedback controller 30 has a first input end 36 electrically connected to the node N3 with the output rectifier 24, a second input end 38 electrically connected to the variable signal generator 44 (such as a variable resistor) capable of generating an adjusting signal according to adjustments made by a user, and an output end 42 electrically connected to the photo coupler 32, which is used for isolating the current between the feedback controller 30 and the pulse width controller 40.

When the combined voltage from the output port 15 and from the variable signal generator 44 is higher than a predetermined voltage, a photo transistors of the photo coupler 32 will have higher current Ic and generate an a higher feedback voltage at node N5, resulting in the pulse width controller 40 reducing the duty cycle of the pulse signal. When the combined voltage from the output port 15 and from the variable signal generator 44 is lower than the predetermined voltage, the photo transistor of the photo coupler 32 will have smaller current Ic and generate a lower feedback voltage at node N5, resulting in the pulse width controller 40 increasing the duty cycle of the pulse signal at node N1.

The duty cycle of the pulse signal generated by the pulse width controller 40 is controlled by the steady state voltage or current at the output port 15 of the power supply 10 and the adjustable signal from the variable signal generator 44. The steady state voltage or current at the output port 15 is controlled by the duty cycle of the pulse signal. Because of this feedback loop, a user is able to manually adjust the variable signal generator 44 of the power supply 10 so as to match the required voltage of the electronic device. The variable signal generator 44, which can be an adjustable voltage source or an adjustable current source, generates an indicative adjusting signal.

However, the conventional power supply 10 fails to automatically detect the required power when the user does not know in advance the required power of the electronic device. It is possible that the user may incorrectly adjust the voltage at the output port 15, which may potentially damage the electronic device. This results in a deep inconvenience for the user.

The other solution is using different type power supplies for different type electric devices. So, an end user needs to prepare various type power supplies. It is also inconvenient and costly for the end user.

SUMMARY OF INVENTION

It is therefore a primary objective of the present invention to provide a power supply to solve the aforementioned problem.

According to the claimed invention, a power supply can output a steady state voltage or current according to a load requirement. The power supply comprises a power supply unit and a control circuit. The power supply unit has an input end for receiving an oscillating voltage, and an output end for outputting a steady state voltage or current from the oscillating voltage according to a feedback signal. The control circuit comprises a micro-controller for generating a control voltage according to a measuring signal from a load, and a feedback controller having a first input end electrically connected to the output end of the power supply for receiving the steady state voltage or current, a second input end electrically connected to the micro-controller for receiving the control voltage from the micro-controller, and a output end for outputting the feedback signal according to the control voltage and the steady state voltage or current. With the measuring signal from the load, the power supply is capable of outputting the required steady state voltage or current.

It is an advantage of the present invention that the power supply can generate different steady state voltages or currents for different electronic devices with different voltage requirements, without needing manual adjustment for the required voltage.

These and other objects and the advantages of the present invention will no doubt become obvious to those of ordinary skill in the art after having read the following detailed description of the preferred embodiment, as illustrated by the included figures and drawings.

DETAILED DESCRIPTION

Figure 1:
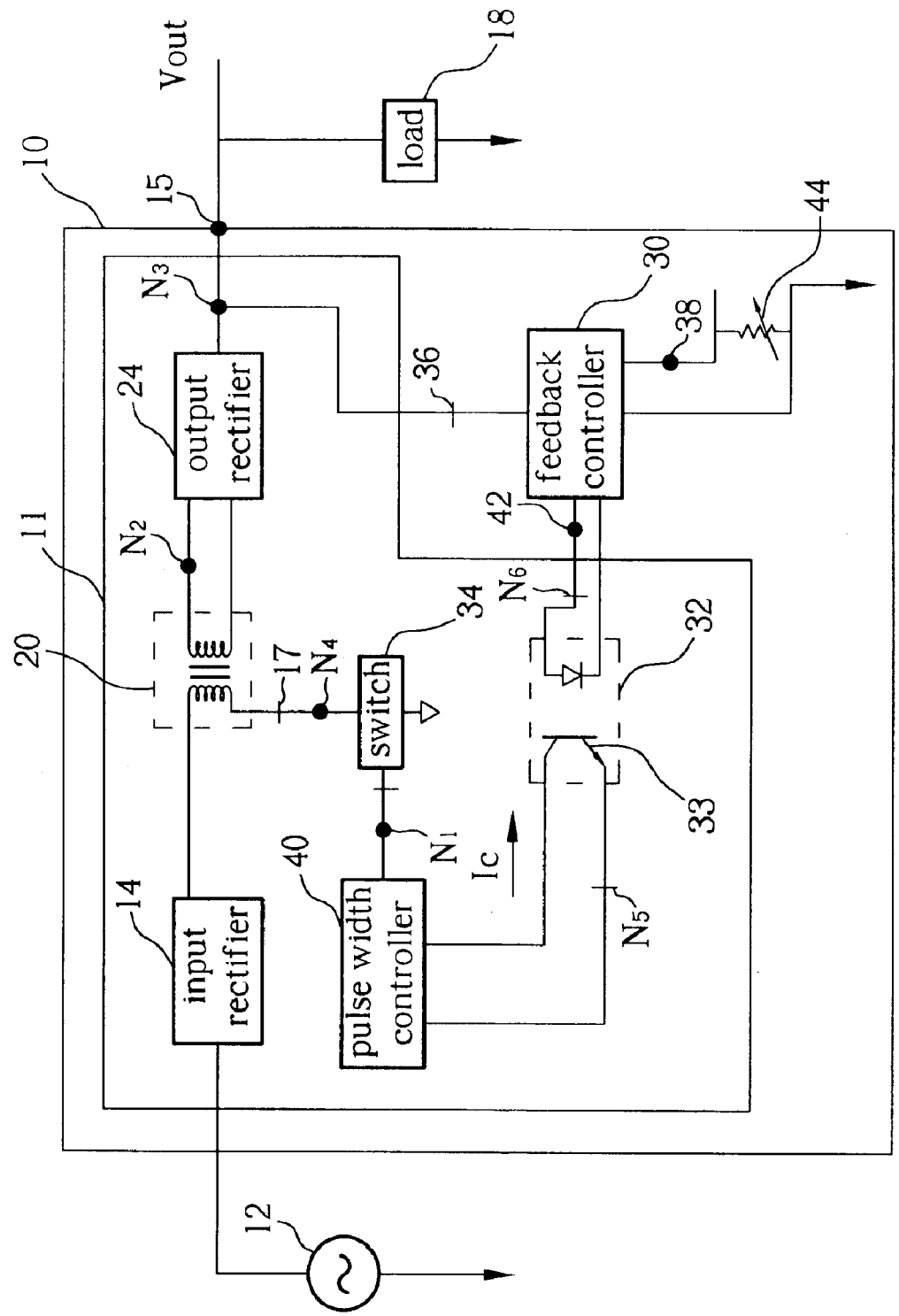
FIG. 1 is a block diagram of a power supply according to the prior art.
Figure 2:
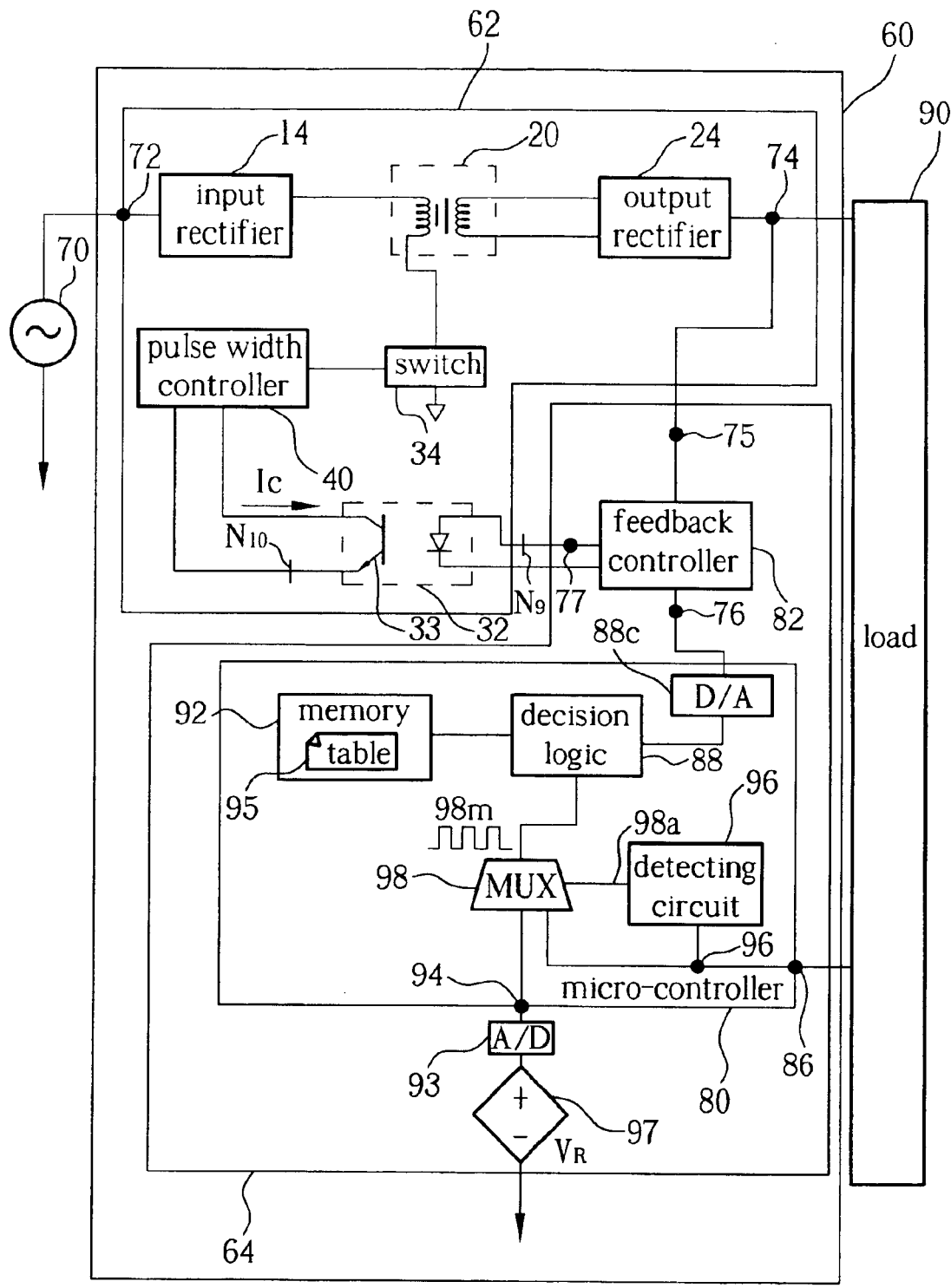
FIG. 2 is a block diagram of a power supply according to the present invention.

Please refer to FIG. 2. FIG. 2 shows a circuit block diagram of a power supply 60 according to the present invention. For simplicity, elements that have the same function as that described in the prior art are provided the same item numbers used in the above description of the prior art. The power supply 60 comprises a power supply unit 62 and a control circuit 64. The power supply unit 62 has an input end 72 for receiving an oscillating voltage 70, and an output end 74 for outputting a steady state voltage or current to a load 90 from the oscillating voltage 70 according to a feedback signal. The power supply unit 62 further comprises an input rectifier 14, a transformer 20, an output rectifier 24, a photo coupler 32, a switch 34, and a pulse width controller 40, with functionality in this embodiment that is the same as that indicated in the prior art. The control circuit 64 comprises a micro-controller 80 and a feedback controller 82. The micro-controller 80 has a first input port 86 for receiving a measuring signal from the load 90, decision logic 88 for generating a control voltage according to the measuring signal, a second input port 94, a variable signal generator 97 electrically connected to the second input port 94 for generating a manual adjusting signal, a detecting circuit 96 electrically connected to the first input port 86 for detecting the presence of the measuring signal from the load 90, a memory 92 for storing a table 95 that records the control voltages corresponding to each measuring signal, and a multiplexer 98 electrically connected to the detecting circuit 96 for selectively outputting the measuring signal or the manual adjusting signal according to the results of the detecting circuit 96.

When the power supply 60 connects to an electronic device with an unknown load 90, a measuring signal corresponding to a voltage or current requirement of the load 90 is detected by the micro-controller 80 via the first input port 86. The measuring signal provided at the input port 86 is a digital signal. The detecting circuit 96 will detect whether the measuring signal on input port 86 is present. If it is, detecting circuit 96 generates a corresponding value (for example, a logical "1") on a MUX control input port 98a, which causes the multiplexer 98 to output the measuring signal 98m present on input port 86. If the detecting circuit 96 determines that the measuring signal is not present on input port 86, then the detecting circuit 96 generates another corresponding value (for example, a logical "0") on the MUX control input port 98a, which causes the multiplexer 98 to output the manual adjusting signal on second input port 94. The manual adjusting signal is transformed by an analog-to-digital converter 93. Detection of a digital signal as provided on input port 86 by the detecting circuit 96 is well known in the art, and does not require a detailed explanation here. Consequently, if both the measuring signal and the manual adjusting signal are input at the same time, the measuring signal is given priority over the manual adjusting signal. After receiving the measuring signal 98m from the multiplexer 98, the decision logic 88 utilizes the measuring signal 98m to index into a lookup table 95 stored in the memory 92. Such indexing is well known in the art to perform value translation. The lookup table 95 records control voltage values corresponding to each measuring signal 98m (whether manually generated at input port 94, or automatically generated at input port 86), to output the control voltage 76 according to the measuring signal 98m. The control voltage 76 is generated by the decision logic 88 by converting the control voltage value into a corresponding voltage by way of a digital-to-analog converter 88c.

The feedback controller 82 has a first input end 75 electrically connected to the output end 74, a second input end 76 electrically connected to the micro-controller 80 for receiving the control voltage from the micro-controller 80, and an output end 77 electrically connected to the power supply unit 62 at node N9. The feedback controller 82 generates a feedback signal at node N9 based on the combination of the control voltage on input port 76 and the output steady state voltage 74. For example, if the combination of the control voltage 76 and the output steady state voltage 74 is higher than a predetermined value, the generated feedback signal causes the photo transistor 33 of the photo coupler 32 to have a bigger current Ic and generate a higher feedback voltage at node N10, resulting in the pulse width controller 40 reducing the duty cycle of the pulse signal. When the combined voltage of the control voltage 76 and the output steady state voltage 74 is lower than the predetermined voltage, the generated feedback signal makes the photo transistor 33 of the photo coupler 32 have a lower current Ic and generate a lower feedback voltage at node N10, resulting in the pulse width controller 40 gradually increasing the duty cycle of the pulse signal. Finally, the transformer 20 outputs a steady state voltage based on the duty cycle of the pulse signal. Consequently, the power supply 60 is capable of outputting a required steady state voltage for the load 90 according to the control voltage 76, which in turn is generated according to the measuring signal 86 or the manual adjusting signal 94. The manual adjusting signal 94 may be generated digitally by the variable signal generator 97 (for example, by way of DIP switches), or may be generated in an analog manner (for example, by way of a variable resistor) and then converted into a digital signal by an appropriate analog-to-digital converter.

Figure 3:
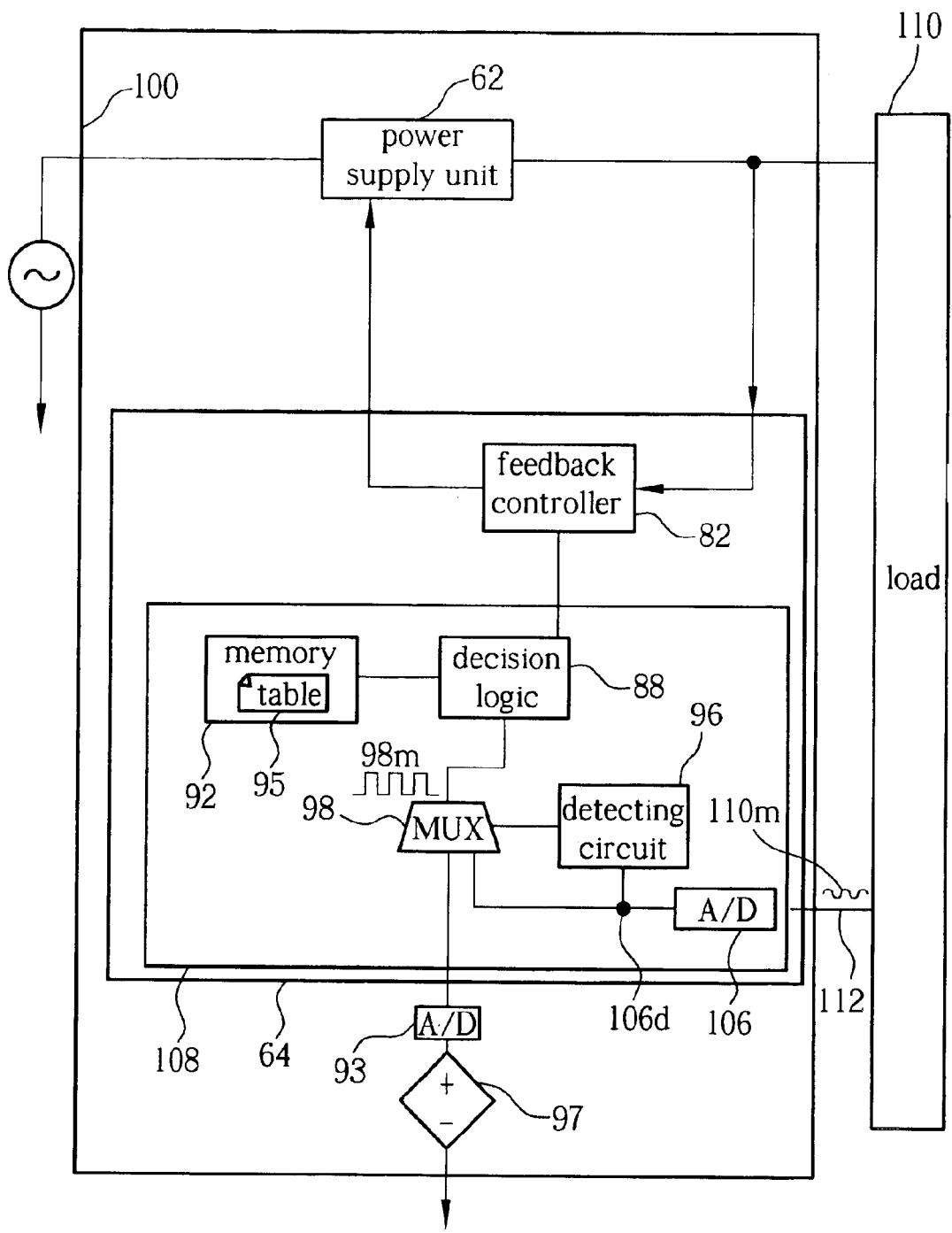
FIG. 3 is a block diagram of another embodiment of a power supply according to the present invention.

Please refer to FIG. 3, which shows a circuit block diagram of another embodiment 100 of the present invention. Differing from the power supply 60 shown in FIG. 2, the micro-controller 108 of the power supply 100 further comprises an analog-to-digital converter 106. If the measuring signal 110m provided by the load 110 is an analog signal (for example, a predefined resistance corresponding to a desired voltage), the analog-to-digital converter 106 converts the analog measuring signal 110m into a corresponding digital measuring signal 106d, which is then capable of being processed by the micro-controller 108. The subsequent processes for the transformed digital signal 106d are the same as that depicted in power supply 60. If the analog measuring signal 110m is not present, then the A/D converter 106 should generate a "not present" value or condition that can be detected by the detection circuit. Alternatively, the detection circuit may directly detect the analog input 112 for the presence of a suitable analog measuring signal. Note that it is possible to provide a combination of the two embodiments 60 and 100 to support both analog measuring signal inputs and digital measuring signal inputs simultaneously.

In contrast to the prior art, the power supply of the present invention provides a power supply unit for outputting a required steady state voltage; a control circuit having a micro-controller for automatically detecting a measuring signal for a voltage requirement of the load, and a feedback controller for generating a feedback signal so as to control the output steady state voltage provided by the power supply unit. Therefore, a user does not need to manually adjust the power supply, which can help to prevent incorrect power settings.

Those skilled in the art will readily observe that numerous modifications and alterations of the device may be made while retaining the spirit and scope of the invention. Accordingly, the above disclosure should be construed as limited only by the metes and bounds of the appended claims.

What is claimed is:

1. A power supply for outputting a steady state voltage or current according to a load requirement, the power supply comprising:
    a power supply unit having an input end for receiving an oscillating voltage, and an output end for outputting a steady state voltage from the oscillating voltage according to a feedback signal; and
    a control circuit comprising:
        a micro-controller comprising a first input port for receiving a measuring signal from a load indicating the load requirement, and decision logic capable of generating a control voltage according to the measuring signal if the measuring signal is received and generating the control voltage according to a manual adjust signal if the measuring signal is not received; and
        a feedback controller having a first input end electrically connected to the output end of the power supply for receiving the steady state voltage, a second input end electrically connected to the micro-controller for receiving the control voltage from the micro-controller, and a output end for outputting the feedback signal according to the control voltage and the steady state voltage.

2. The power supply of claim 1 wherein the micro-controller filer comprises an analog-to-digital converter for transforming an analog measuring signal from the load into a digital measuring signal.

3. The power supply of claim 1 wherein the micro-controller further comprises a second input port and a variable signal generator electrically connected to the second input port for generating the manual adjust signal.

4. The power supply of claim 3 wherein the micro-controller further comprises a detecting circuit electrically connected to the first input port for detecting the presence of the measuring signal, and a multiplexer electrically connected to the detecting circuit; wherein when the measuring signal is detected, the multiplexer outputs the measuring signal, otherwise the multiplexer outputs the manual adjust signal.

5. The power supply of claim 3 wherein the variable signal generator is an adjustable voltage source or an adjustable current source.

6. The power supply of claim 1 wherein the micro-controller further comprises a memory for storing a table that records control voltage values corresponding to each measuring signal, and the decision logic indexes into the table according to the measuring signal to output the control voltage.

7. A power supply for outputting a steady state voltage or current according to a load requirement, the power supply comprising:
    a power supply unit having an input end for receiving an oscillating voltage, and an output end for outputting a steady state voltage from the oscillating voltage according to a feedback signal; and
    a control circuit comprising:
        a micro-controller comprising a first input port for receiving a measuring signal from a load, a detecting circuit electrically connected to the first input port for detecting the presence of the measuring signal, a second input port, a variable signal generator electrically connected to the second input port for generating a manual adjustment signal, a multiplexer electrically connected to the detecting circuit and the variable signal generator, and decision logic connected to an output of the multiplexer for generating a control voltage according to the output of the multiplexer, wherein when the measuring signal is detected, the multiplexer outputs the measuring signal, otherwise the multiplexer outputs the manual adjust signal; and
        a feedback controller having a first input end electrically connected to the output end of the power supply for receiving the steady state voltage, a second input end electrically connected to the decision logic for receiving the control voltage from the micro-controller, and a output end electrically connected to the power supply unit for outputting the feedback signal according to the control voltage and the steady state voltage.

8. The power supply of claim 7 wherein the micro-controller fierier comprises a memory for storing a table that records control voltage values corresponding to each measuring signal, and the decision logic indexes into the table according to the measuring signal to output the control voltage.

9. A power supply comprising:
    an output for outputting a steady state voltage or current according to a feedback signal;
    an input for receiving the feedback signal;
    a feedback controller comprising a first input connected to the output of the power supply, a second input for receiving a control voltage, and an output connected to the input of the power supply for transmitting the feedback signal to the power supply according to a control voltage; and
    a micro-controller comprising an output connected to the second input of the feedback controller, a detecting circuit capable of detecting the presence of a measuring signal from a load, a variable signal generator for generating a manual adjustment signal, and a multiplexer having inputs respectively connected to outputs of the detecting circuit and the variable signal generator and an output electrically connected to the output of the micro-controller, the micro-controller outputting the control voltage according to the measuring signal when the measuring signal is detected, the micro-controller outputting the control voltage according to the manual adjust signal when the measuring signal is not detected.

10. The power supply of claim 9 wherein the micro-controller further comprises decision logic connected between the output of the multiplexer and the output of the micro-controller, the decision logic generating the control voltage according to the output of the multiplexer.

11. The power supply of claim 10 wherein the micro-controller further comprises a memory for storing a table that records control voltage values corresponding to each measuring signal, and the decision logic indexes into the table according to the measuring signal to output the control voltage.

* * * * *